Figures 1, 2:
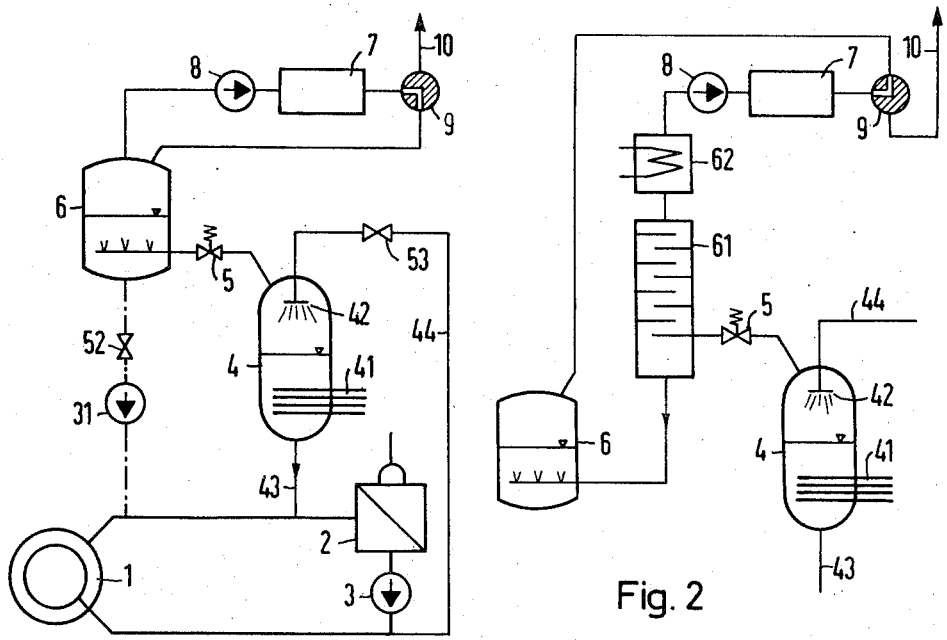

United States Patent [19]
Gramer et al.

[11] 3,789,577
[45] Feb. 5, 1974

[54] THERMAL DEGASSING OF THE PRIMARY COOLANT OF NUCLEAR REACTORS

[75] Inventors: Gottfried Gramer, Furth; Roland Korn, Nurnberg, both of Germany

[73] Assignee: Siemens Aktiengesellschaft, Berlin and Munich, Germany

[22] Filed: Jan. 28, 1972

[21] Appl. No.: 221,727

[30] Foreign Application Priority Data
Jan. 30, 1971 Germany.................. P 21 04 356.1

[52] U.S. Cl.............................. 55/42, 55/51, 55/76
[51] Int. Cl....................... B01d 19/00, B01d 53/02
[58] Field of Search...................... 55/36, 39, 40–42, 55/46, 51, 55, 66, 68, 74, 76; 176/37

[56] References Cited
UNITED STATES PATENTS

| | | | |
|---|---|---|---|
| 3,327,774 | 6/1967 | Forster | 55/208 X |
| 3,459,635 | 8/1969 | Bevilacqua et al. | 176/37 |

*Primary Examiner*—Samih N. Zaharna
*Assistant Examiner*—Richard W. Burks
*Attorney, Agent, or Firm*—Arthur E. Wilfond et al.

[57] ABSTRACT

Part of the primary coolant to be degased is fed through the pressure maintenance device wherein the primary coolant is further heated and partially evaporated. The vaporized coolant is withdrawn from the pressure maintenance device together with the gases released from the coolant and is condensed while the released gases are removed by an adsorption device.

6 Claims, 3 Drawing Figures

THERMAL DEGASSING OF THE PRIMARY COOLANT OF NUCLEAR REACTORS

The invention relates to method and apparatus for thermal degassing of the primary coolant of nuclear reactors and, more particularly, for such reactors that are equipped with pressure maintenance devices or pressurizers. Such degassing is necessary because, in the course of operation of a nuclear reactor, particularly as fuel elements become defective, radioactive gases dissolve in the coolant, resulting in some instances in an unduly high contamination of the primary circulatory loop of the reactor. This would be noted as particularly troublesome when repair work has to be performed on components of such circulatory loops, such as on heat exchangers, for example.

Thermal degassing of water has been known heretofore, the dissolved gases being expelled by heating as well as being carried away by means of a carrier gas flow and, if necessary, being removed from the carrier gas flow by suitable adsorption devices. Inasmuch as extremely large quantities of cooling water circulate in nuclear reactor installations, however, such adsorption devices would have to be very large and expensive if they were to serve the purpose in reactor installations. The problem that was therefore presented to the nuclear reactor technological fraternity was how to effect thermal degassing of reactor coolant by using as much as possible equipment already present in the reactor installation, and without making any extensive addition such as of pressure vessels and the like.

It is accordingly an object of the invention to provide method and apparatus for thermally degassing the primary coolant of nuclear reactors which avoids the foregoing problem and which, more particularly, requires a minimum of added equipment.

With the foregoing and other objects in view, there is provided, in accordance with the invention, method of thermally degassing the primary coolant of a nuclear reactor which comprises passing part of the primary coolant through a pressure maintenance device; adjustably supplying heating power to the pressure maintenance device which corresponds to the amount of heat necessary, at adjusted pressure, for raising the temperature of the primary coolant flowing through the pressure maintenance device to vaporizing temperature and for adding the required heat of vaporization thereto so as to vaporize the coolant; withdrawing the vaporized coolant from the pressure maintenance device and extracting therefrom the gases originally contained in the liquid coolant and entrained by the vaporized coolant. Thus, the pressure maintenance device which is conventionally available in pressurized water nuclear power plants for the adjustment and regulation of the operating pressure in the primary circulatory loop thereof, is used in the method of the invention for effecting the thermal degassing of the primary coolant. In such power plants there is further available a so-called pressure maintenance blow-down or relief tank which is partially filled with liquid coolant, such as water, and serves for condensing the excess coolant vapor or steam which escapes through a pressure-reducing valve if over-pressure or excess pressure should develop in the primary system. The pressure maintenance device or pressurizer of the nuclear power plant comprises a pressure vessel which is partially filled with liquid coolant, such as water, and contains an electrical heating device. The pressure vessel is connected to the primary circulatory loop and transmits thereto the pressure generated in the pressure vessel by the vaporization of the liquid coolant or the boiling of the water. In addition to providing means for adjusting the heating power applied to the liquid coolant in the pressure maintenance device, a spray device for condensing the vapor or steam that is generated is provided for use if the pressure is to be reduced. The coolant does not therefore flow through the pressure maintenance device during normal operation.

In carrying out the method of the invention, there is required, in addition to the aforementioned devices which are conventionally available in a pressurized water reactor installation, a device for collecting or absorbing the gases that had become dissolved in the reactor coolant. No purging or rinsing gases which are known in the art, are necessary for the invention of the instant application. The coolant vapor or steam so-to-speak takes the place thereof. Since the vaporized coolant or steam recondenses into liquid coolant or water, the remaining gas flow contains the gases that are to be removed, such as xenon and krypton, for example, virtually in undiluted form.

Other features which are considered as characteristic for the invention are set forth in the appended claims.

Although the invention is illustrated and described herein as thermal degassing of the primary coolant of nuclear reactors, it is nevertheless not intended to be limited to the details shown, since various modifications may be made therein without departing from the spirit of the invention and within the scope and range of equivalents of the claims.

Figure 3:
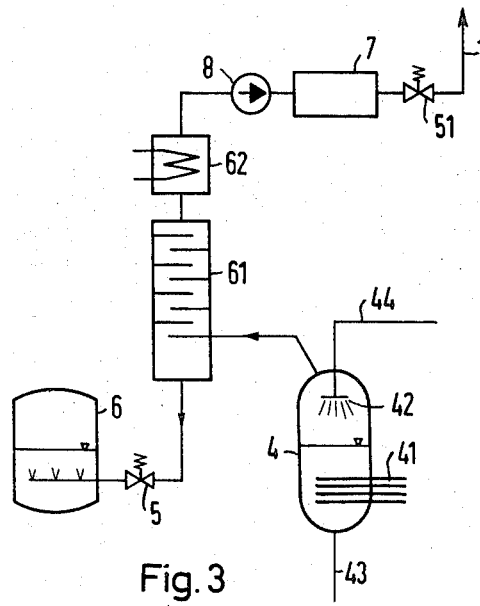

The invention, however, together with additional objects and advantages thereof will be best understood from the following description when read in connection with the accompanying drawing, in which:

FIGS. 1 to 3 are diagrammatic views of different embodiments of apparatus for carrying out the method of thermally degassing primary coolant of nuclear reactors, according to the invention, showing for each of the embodiments a pressure maintenance blow-down or relief tank as well as an excess pressure valve located between the latter and the conventional pressure maintenance device of the reactor installation.

Mutually corresponding components of the apparatus of the invention identified by the same reference numerals in all of the figures.

Referring now first to FIG. 1 of the drawing, there is shown therein a primary circulatory loop of a nuclear reactor 1 which, in simplified form, contains a steam generator 2 and a pump 3. A pressure maintenance device 4 of the reactor installation, made up of a pressure vessel having an electric heater 41 and a spray device 42, is connected by a line 43 to the primary circulatory loop. The spray device 42 is connected to the primary loop through a line 44, in which a valve 53 is located. By switching on the electric heater 41, more liquid coolant or water is vaporized and the pressure in the pressure maintenance device 4, as well as in the primary circulatory loop through the line 43, is thereby decreased. If the pressure is to be reduced, the valve 53 is opened more or less widely so that the spray device 42 responds accordingly. Part of the vapor or steam content of the pressure maintenance device 4 is thereby condensed, and the pressure in the entire system accordingly reduced.

The pressure maintenance device 4 is connected to a pressure maintenance blow-down or relief tank 6 through an excess pressure or overpressure valve 5. The tank 6, like the pressure maintenance device 4, is also partially filled with liquid coolant or water up to the level indicated by the small black triangle. If excess pressure is produced in the pressure maintenance device 4 which is not timely compensated for by the spray device 42, vapor or steam penetrates into the pressure maintenance relief tank 6 through the valve 5 and condenses in the relief tank 5 as it flows upwardly through the liquid coolant or water contained therein. The component devices mentioned up to this point are conventionally included in any pressurized water reactor installation. To carry out and complete the method of the invention, an adsorption device 7 is connected to the pressure maintenance relief tank 6 through a pump 8, in the embodiment of FIG. 1. Radioactive and non-radioactive gases removed from the circulatory system are retained in the adsorption device 7. Non-radioactive gases, such as hydrogen or helium, for example, are either returned to the pressure maintenance relief tank 6 through a two-way valve 9 or are released by the latter to atmosphere through the line 10.

The method of the invention is carried out as follows: The valve 53 in the line 44 is opened and a flow of the primary coolant to be degassed is pumped, by the pump 3 of the primary circulatory loop, through the spray 42 to the pressure vessel 4, returning through the line 43. Simultaneously, the heating power is increased by suitably adjusting the electrical energy supplied to the heater 41 so that the quantity of liquid traversing the pressure vessel 4 is brought to the vaporizing or boiling point. If the normal coolant temperature on the outlet side of the nuclear reactor is 314°C, for example, and the pressure is 140 atmospheres excess pressure, the boiling or vaporizing temperature within the pressure maintenance device 4 is about 354°C. The quantity of liquid coolant or water flowing through the system is, for example, 11 tons per hour. Through the overpressure valve 5, about 200 to 400 kg of vaporized coolant or steam are withdrawn per hour and expanded downstream of the valve 5 to one atmosphere excess pressure. By this removal of coolant vapor or steam, the normal operating pressure within the primary circulatory system of the nuclear reactor is kept constant. Those gases that were previously contained in dissolved form in the liquid coolant, are admixed with the withdrawn coolant vapor or steam. As mentioned hereinbefore, the steam or coolant vapor passing through overpressure valve 5 is condensed in the pressure maintenance blow-down or relief tank 6; the gases entrained with the coolant vapor or steam collect in the space above the water level in the relief tank 6. This space has already been filled beforehand with hydrogen or helium gas. The coolant vapor or steam condensing in the pressure maintenance relief tank 6 is returnable to the primary circulatory loop through the line represented by dots and dashes and through a valve 52 as well as a pump 31 connected in that line, so that the coolant or water circulatory loop is closed without any loss. Obviously, the condensed coolant vapor or steam can also be returned to a non-illustrated volume equalization tank, which is generally provided in every reactor installation as part of a coolant purification system, and which is also connected to the primary circulatory loop of the nuclear reactor in a manner generally known but not shown here. The coolant gases collecting in the pressure maintenance blow-down or relief tank 6 are fed through a pump 8 to a gas adsorption device 7, which is maintained in a conventional manner at very low temperature of, for example, −80° to −190°C. The previously dissolved gases are extracted in the gas adsorption device 7 and are either stored, together with the adsorption containers that have been filled to saturation therewith, in chambers provided therefor for permitting decay of radioactivity therein, or are filled from the adsorption containers into pressure bottles in highly concentrated form. The non-adsorbed gases are hydrogen or helium, for example, considerably lower adsorption temperatures being necessary therefor. Since these non-adsorbed gases are not radioactive, they can either be released to atmosphere through the line 10 or, upon suitably changing the position of the valve 9, they can be returned to the tank 6 to serve as protective gas.

This degassing method of the invention can be carried out intermittently or continuously, during the operation of the reactor. Furthermore, it is possible to practice the method of the invention when the reactor is shut down or in subcritical condition, e.g. also during so-called after-cooling operation. Accumulation or storage of radioactive liquid coolant or water is not necessary since it is possible to return the water condensed in the pressure maintenance relief tank 6 to the primary circulatory loop.

In FIGS. 2 and 3, there are shown other possible embodiments of apparatus for degassing the primary coolant which make use of devices which are already present in the reactor installation. The primary circulatory loop is omitted in FIGS. 2 and 3 for the purpose of simplifying the drawing and assuring the clarity of the essential features of the invention.

In FIG. 2, a gas scrubbing column 61 as well as a low-pressure condenser 62 are provided on the low pressure side of the overpressure valve 5. Downstream of the low pressure condenser 62, the gas adsorption device 7 is connected thereto through the pump 8 and is, in turn, connectible through the valve 9 with the pressure maintenance relief tank 6. In contrast to the embodiment of FIG. 1, the condensation of the expanded coolant vapor or steam is not carried out in the pressure maintenance relief tank 6 in the embodiment of FIG. 2, but rather in a separate device, namely the gas scrubbing device 61.

The embodiment of FIG. 2 operates in the manner briefly described hereinafter: The coolant vapor or steam coming from the overpressure valve 5 is condensed in the low-pressure condenser 62 and then travels downwardly through the gas scrubbing column 61 which may be built as a fractionating column having two columns of vertically spaced trays laterally overlapping one another. The degassed water descends into the pressure maintenance relief tank 6, while the separated formerly dissolved gases are transported through the pump 8, as in the embodiment of FIG. 1, to the adsorption device 7 where they are adsorbed.

This combination of a condenser and a gas scrubbing column can also be disposed on the high pressure side of the overpressure valve 5 as in the embodiment of FIG. 3. In FIG. 3, the high pressure condensate produced in the gas scrubbing column 61 is fed through the overpressure valve 5 to the pressure maintenance relief tank 6. Downstream of the adsorption device 7, a pressure reducing valve 51 is provided, which expands the remaining residual gas, helium or hydrogen or possibly also nitrogen.

It is believed that no detailed description of the gas adsorption device 7 is necessary since they are well known in the art, and varying types thereof can, of course, be used in the invention of the instant application. Also, further structural variations of the degassing apparatus of the invention are possible by using the pressure maintenance overpressure valve 5 and the pressure maintenance relief tank 6 and, in some circumstances by employing combinations of the devices shown in the different figures of the drawing. Obviously, feeding of the primary coolant which is to be degassed, to the pressure maintenance device 4 from the aforementioned non-illustrated volume control system, would also be possible.

A further great advantage of the method of the invention is seen in the fact that it can be applied, without difficulty, afterwards in any nuclear reactor installation operating with pressurized water.

For boiling water nuclear reactors, an analogous modification of the method can be readily adapted to such reactors by thos of ordinary skill in the art.

We claim:

1. Method of thermally degassing the primary coolant of a nuclear reactor installation having a primary circulatory loop for the coolant and a pressure maintaining device for maintaining the pressure in the primary circulatory loop which comprises passing part of the primary coolant through the pressure maintaining device, adjustably supplying heating power to the pressure maintaining device in an amount corresponding to the amount of heat necessary, at adjusted pressure, for raising the temperature of the primary coolant flowing through the pressure maintenance device to vaporizing temperature and for adding heat of vaporization thereto so as to vaporize the coolant, withdrawing the vaporized coolant from the pressure maintenance device, and extracting therefrom the gases originally contained in the liquid coolant and entrained by the vaporized coolant.

2. Method according to claim 1 wherein the nuclear reactor installation, for reasons of safety, is also provided with an excess pressure valve and a pressure maintenance relief tank, and which comprises feeding the vaporized coolant from the pressure maintenance device through the excess pressure valve and into the pressure maintenance relief tank so that the gases originally contained in the liquid coolant accumulate in a space above a level of the liquid coolant contained in the pressure maintenance relief tank, passing the accumulated gases through an adsorption stage wherein they are separated from a difficult-to-condense and non-radioactive gaseous components, and collecting the separated gases in highly concentrated form.

3. Method according to claim 2 wherein the difficult-to-condense and non-radioactive gaseous component is at least one of the gases selected from the group consisting of hydrogen, helium and nitrogen gases.

4. Method according to claim 3 which includes recirculating the difficult-to-condense and non-radioactive gaseous component to the pressure maintenance relief tank.

5. Apparatus for carrying out the method of thermally degassing the primary coolant of a nuclear reactor installation according to claim 1 wherein the reactor installation includes a primary circulatory loop for the coolant, a pressure maintaining device connected thereto for maintaining the pressure therein, a pressure maintenance relief tank and an excess pressure valve, the pressure maintenance relief tank being connected to the low pressure side of the excess pressure valve, and the pressure maintenance device being connected to the high pressure side of the excess pressure relief valve, and comprising a gas scrubbing column with a gas adsorption device connected thereto being connected to the high pressure side of the excess pressure valve between the pressure maintenance device and the pressure maintenance relief tank so that the degassed condensate from the gas scrubbing column passes directly into the pressure maintenance relief tank.

6. Apparatus for carrying out the method of thermally degassing the primary coolant of a nuclear reactor installation according to claim 1 wherein the reactor installation includes a primary circulatory loop for the coolant, a pressure maintaining device connected thereto for maintaining the pressure therein, a pressure maintenance relief tank and an excess pressure valve, the pressure maintenance relief tank being connected to the low pressure side of the excess pressure valve and the pressure maintenance device being connected to the high pressure side of the excess pressure relief valve, and comprising a gas scrubbing column with a gas adsorption device connected thereto being connected to the low pressure side of the excess pressure valve between the pressure maintenance device and the pressure maintenance relief tank so that degassed condensate from the gas scrubbing column passes through the excess pressure valve into the pressure maintenance relief tank.

* * * * *